United States Patent
Cesar et al.

(10) Patent No.: US 9,072,063 B2
(45) Date of Patent: Jun. 30, 2015

(54) METHOD FOR REDUCING INTERFERENCE IN THE DOWNLINK DIRECTION OF A CELLULAR RADIO COMMUNICATION NETWORK AND CORRESPONDING BASE STATION

(75) Inventors: Bozo Cesar, Stuttgart (DE); Hardy Halbauer, Ettlingen (DE); Mark Doll, Stuttgart (DE); Robert Fetscher, Stuttgart (DE); Bernd Gloss, Stuttgart (DE); Oliver Stanze, Stuttgart (DE); Jürgen Otterbach, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 760 days.

(21) Appl. No.: 12/538,562

(22) Filed: Aug. 10, 2009

(65) Prior Publication Data

US 2010/0041425 A1 Feb. 18, 2010

(30) Foreign Application Priority Data

Aug. 13, 2008 (EP) .................................... 08305474

(51) Int. Cl.
H04B 1/00 (2006.01)
H04W 52/34 (2009.01)
H04W 72/08 (2009.01)
H04W 16/10 (2009.01)

(52) U.S. Cl.
CPC ............ *H04W 52/346* (2013.01); *H04W 16/10* (2013.01); *H04W 72/082* (2013.01)

(58) Field of Classification Search
CPC .. H04W 16/10; H04W 52/346; H04W 72/082
USPC ...................................................... 455/63.1
See application file for complete search history.

(56) References Cited

U.S. PATENT DOCUMENTS 7,039,410 B2   5/2006  Jovanovic
7,574,179 B2 * 8/2009  Barak et al. .................... 455/101

(Continued)

FOREIGN PATENT DOCUMENTS

CN    1541025       10/2004
EP    1 653 634 A2   5/2006

(Continued)

OTHER PUBLICATIONS

Japanese Office Action dated Jul. 11, 2013.

(Continued)

*Primary Examiner* — David Bilodeau
(74) *Attorney, Agent, or Firm* — Fay Sharpe LLP

(57) ABSTRACT

The present invention relates to a method for reducing interference in the downlink direction of a cellular radio communication system comprising base stations communicating with terminals using a frame structure showing a time and frequency extension, said frame comprising a preamble portion and at least one data portion, said terminals being adapted to receive frames for which the receive power of said at least one data portion is varying in a predefined range relative to the receive preamble power of said preamble portion,
According to the present invention, the method comprises the steps of:
transmitting the part of said data portion destined to said terminal with a transmit power adapted to generate a first receive power (Plow) at said terminal within said range if said terminal belongs to a first group of terminals;
transmitting the part of said data portion destined to said terminal with a transmit power adapted to generate a second receive power (Phigh) at said terminal within said range, said second receive power being higher than said first receive power, if said terminal belongs to a second group of terminals.

11 Claims, 4 Drawing Sheets

(56) References Cited

U.S. PATENT DOCUMENTS

| | | |
|---|---|---|
| 2005/0096061 A1* | 5/2005 | Ji et al. ............... 455/450 |
| 2006/0092875 A1* | 5/2006 | Yang et al. ............ 370/329 |
| 2007/0291702 A1* | 12/2007 | Nanba et al. .......... 370/336 |
| 2008/0031197 A1* | 2/2008 | Wang et al. ........... 370/331 |

FOREIGN PATENT DOCUMENTS

| | | |
|---|---|---|
| EP | 1 811 689 A1 | 7/2007 |
| KR | 10-2008-64122 | 7/2008 |
| WO | WO 2006/043588 | 4/2006 |
| WO | WO 2007/024791 | 3/2007 |
| WO | WO 2007/043782 | 4/2007 |
| WO | WO 2008/035900 A1 | 3/2008 |

OTHER PUBLICATIONS

European Search Report, Dec. 29, 2008.

English Translation of Korean Office Action dated Feb. 16, 2012.

\* cited by examiner

METHOD FOR REDUCING INTERFERENCE IN THE DOWNLINK DIRECTION OF A CELLULAR RADIO COMMUNICATION NETWORK AND CORRESPONDING BASE STATION

The invention is based on a priority application EP 08 305 474.2 which is hereby incorporated by reference.

TECHNICAL FIELD

The present invention relates to a method for reducing interference in a cellular radio communication system, where the frame structure has a time and frequency extension.

BACKGROUND OF THE INVENTION

Orthogonal Frequency Division Multiplexing (OFDM) based networks are examples for such cellular radio communication networks with a frame structure showing a time and frequency extension. These networks use a multi-carrier transmission technique and are foreseen to be used as access technology in the fourth generation of wireless/mobile communication networks thanks to their ability especially in combination with MIMO/beamforming antenna technology to reach very high bit rates. OFDM offers a sensible alternative for high-speed mobile applications, and thus represents an important step for next generation mobile radio systems or for a $4^{th}$ generation air interface to be defined in 3G LTE, 802.16e and 802.16m.

In multi-carrier systems as OFDM transmission systems, the transmitted data is split into a number of parallel data streams, each one used to modulate a separate sub-carrier. In other words, the broadband radio channel is subdivided into a plurality of narrow-band sub-carriers or subchannels, which are groups of sub-carriers, being independently modulated with e.g. QPSK, 16 QAM, 64 QAM or higher modulation order allowing higher data rate per sub-carrier. The sub-carriers allocation to a user consists either in consecutive (physically adjacent) sub-carriers allocation in a part of the frequency domain of the system also called frequency selective allocation or in allocation of sub-carriers spread over the entire frequency band of the system called frequency diverse allocation or PUSC in the context of WIMAX.

In such multicarrier systems, the sub-carrier frequencies can be allocated to a user channel on a short term basis (e.g. all 2 ms) as well as the modulation order per sub-carrier defining a transmission channel for each user should be updated on the same short term basis.

In order to exploit the best capacity of multicarrier systems, they are used with resource allocations following a frequency reuse 1 scheme. This means that the whole range of frequency sub-carriers are used in all cells and even in all sectors of one cell. Other frequency reuse schemes on the contrary foresee that the available frequency sub-carriers are not simultaneously used in the different sectors of one cell or in adjacent sectors of adjacent cells. Frequency reuse 3 scheme foresees for example that in a cell comprising 3 sub-sectors only one third of the available frequencies can be used in the first sector, another third in a second sector and the last third in the last sector.

The advantage of frequency reuse 1 schemes is the higher spectral efficiency which can be reached compared to frequency reuse 3, its disadvantage is a high and complex interference generated by users or base stations using the same resource at the same time.

It is a particular object of the present invention to provide a method for coping with the problem of interference in such a multicarrier system ensuring high data rates for the end-users.

Another object of the invention is to provide a corresponding base station adapted to implement the method.

SUMMARY OF THE INVENTION

These objects, and others that appear below, are achieved by a method for reducing interference in the downlink direction of a cellular radio communication system comprising base stations communicating with terminals using a frame structure showing a time and frequency extension, said frame comprising a preamble portion and at least one data portion, said terminals being adapted to receive frames for which the receive power of said at least one data portion is varying in a predefined range relative to the preamble receive power of said preamble portion, and a base station adapted to be used in a cellular radio communication network, said base station communicating with terminals using a frame structure showing a time and frequency extension, said frame comprising a preamble portion and at least one data portion, said terminals being adapted to receive frames for which the receive power of said at least one data portion is varying in a predefined range relative to the preamble receive power of said preamble portion.

According to the present invention, the terminals have a nominal receive power level for receiving the data portion of a frame in normal operation (e.g. without beamforming) but are able to work with a receive power level increased compared to the nominal receive power (especially requested in case of operation with beamformed signals). The range in which the terminals are adapted to the receive signal has a predefined amplitude relative to the received preamble power level. The amplitude relative to the received preamble level is obtained after amplifier gain control. The nominal and increased receive power levels are defined relative to the preamble receive power level. Indeed due to the distance between the terminal and the base station on the one hand and on the channel characteristics, the receive power level of the preamble and of the data portion of the frame can vary greatly in absolute value. The range of the relative variation of the receive power level for the data portion compared to the preamble receive power level is a characteristic of the receiver and defines the nominal receive power and increased receive power levels.

According to the present invention, at least two groups of terminals are defined thanks to different criteria. The data portion destined to a terminal is transmitted with a transmit power adapted to generate a first receive power level within the predefined range if the terminal belongs to the first group of terminals and the data portion destined to a terminal is transmitted with a transmit power adapted to generate a second receive power level, higher than the first receive power level, within the predefined range if the terminal belongs to the second group of terminals In a first embodiment of the present invention, a terminal is associated to the first or the second group depending on the preamble receive power level or preamble CINR of the frame experienced at the terminal.

In a second embodiment of the present invention, a terminal is associated to the first or the second group depending on the interference level in the at least one data portion of the frame experienced at the terminal.

In a third embodiment of the present invention, a terminal is associated to the first or to the second group depending on a bit error ratio in the at least one data portion of the frame experienced at the terminal.

The method according to the present invention presents the advantage to further increase the throughput in the network while allocating resources more flexibly.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF PREFERRED EMBODIMENTS

Figure 1:
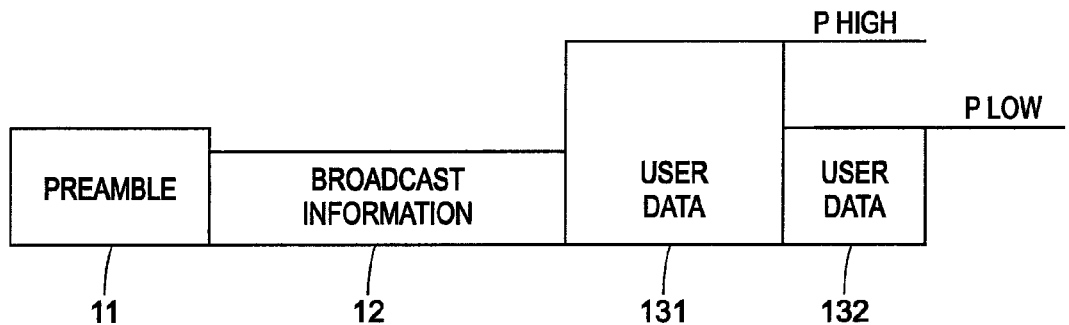
FIG. 1 shows different power levels on a frequency subcarrier of a frame received at an end user according to the present invention.

FIG. 1 shows the different power levels on a frequency subcarrier of a frame received at an end user according to the present invention.

FIG. 1 is a representation of a signal power versus time domain on one frequency subcarrier used in a multicarrier cellular radio communication network. As it will be understood by those skilled in the art, the signal belonging to one user is carried on several sub carriers so that the different sub carriers carrying the signal containing data destined to one user will have similar power profile than the represented frequency subcarrier. The power level for the rest of the signal will nevertheless depend on the users scheduled on these subcarriers.

A part 11 of the signal on a subcarrier is constituted by a preamble which shows a power level Ppreamble.

Part 12 of the signal comprises preferably broadcast information addressed to all terminals which shows a power level Pbroadcast. Such a part 12 is not mandatory in the framework of the present invention.

Part 13 of the signal comprises user data 131, 132 destined to different users showing different power levels Plow, Phigh determined according to the present invention. According to the present invention, the terminals are adapted to receive the data portion with a receive power within a predefined range relative to the preamble receive power level. The amplitude of the receive power relative to the received preamble level is obtained after amplifier gain control. Typically, the terminal is not only adapted to receive the data portion at a nominal receive power relative to the preamble receive power level but must be able to work with a signal showing some dBs power level increase. Such requirements are defined for example in the WIMAX Radio Conformance Tests specifications and are primarily intended for the use of beamforming in the network. More precisely, when using beamforming, a signal destined to a terminal consists in a beam specifically oriented in the direction of the end user, this results in that a beamformed signal is less susceptible to create interference within the cell due to the narrow geometry of the beam. Due to the concentration of the signal energy within a narrow beam, the receive power level of the beamformed portion of the signal is increased relative to the signal portions transmitted without beamforming. The power level of the data portion is preferably increased by the amount of dB (for example 6 dB) gained thanks to beamforming.

The present invention exploits the requirement defined for terminals in a way that the base station transmits the data portion of the frame either with a first "high" power level towards some terminals resulting in a receive power level Phigh at the corresponding terminal or with a "low" power level towards some other terminals resulting in a receive power level Plow at the corresponding terminals. According to the present invention, the base station is able to define the power level to use on a per burst and per user basis. The base station is able to raise or decrease the power level used between these at least two levels within the same frame duration on all the subcarriers of the system individually.

A general criteria according to the present invention for determining the transmit power level for the different terminals consists in defining at least two groups of terminals and selecting the first power level or the second power level for transmission depending on the group to which the terminal belongs to.

A first implementation of this general criteria will be explained together with FIG. 2.

Figure 2:
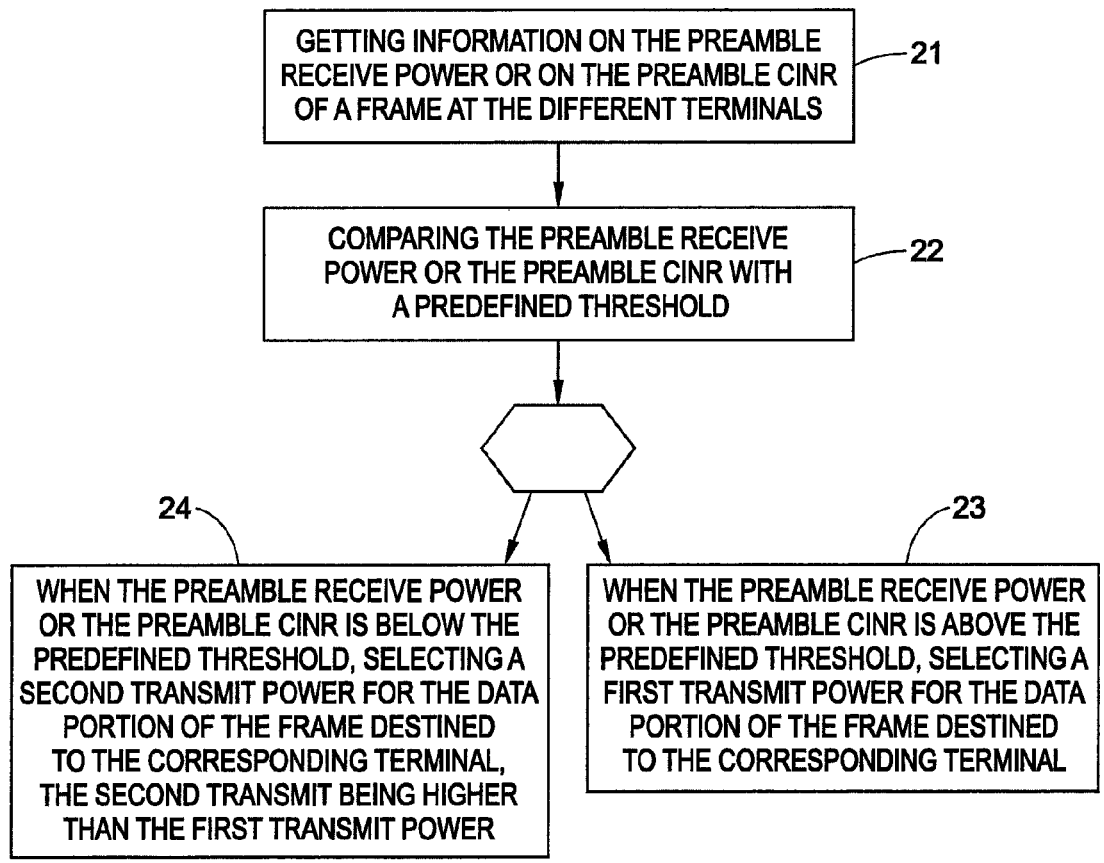
FIG. 2 shows a method according to the present invention.

FIG. 2 shows a method according to the present invention comprising steps 21 to 24.

step 21 consists in getting information on the preamble receive power or on the preamble CINR (Carrier to Interference and Noise Ratio) of a frame at the different terminals. The preamble of the frame is usually transmitted with a predefined power which is above the nominal transmit power of the data portion. Preferably, the preamble receive power or the preamble CINR are averaged over the different subcarriers by the terminal and indicated through signaling to the network.

Step 22 consists in comparing the preamble receive power or the preamble CINR with a predefined threshold Step 23 is applied when the preamble receive power or the preamble CINR is above the predefined threshold and consists in selecting a first transmit power for the data portion of the frame destined to the corresponding terminal.

Step 24 is applied when the preamble receive power or the preamble CINR is below the predefined threshold and consists in selecting a second transmit power for the data portion of the frame destined to the corresponding terminal, the second transmit power being higher than the first transmit power.

In a second embodiment of the present invention, instead of using information on the preamble receive power or on the preamble CINR to determine both groups of terminals, the interference level in the data portion of the frame is used to determine both groups of terminals. This interference level is preferably obtained by evaluation of the pilot symbols for the residual error between the known transmitted pilot symbol and the pilot symbol detected at the receiver.

In a third embodiment of the present invention, information on the bit error ratio (BER) of the data portion is used to determine both groups of terminals. This information on the bit error ratio at a predefined modulation and coding rate is preferably obtained from MAC packet loss ratios (e.g. if CC and CTC coding is used) or directly from coding block error ratios (e.g. if Reed Solomon coding is used).

In the following, the term "selection criterion" will be used to embrace all three criteria used in the three embodiments of the invention. It will nevertheless be understood by those skilled in the art that preamble receive power or preamble CINR resp. interference level in the data portion, resp. bit error rate in the data portion are meant by the term selection criterion.

Figure 3:
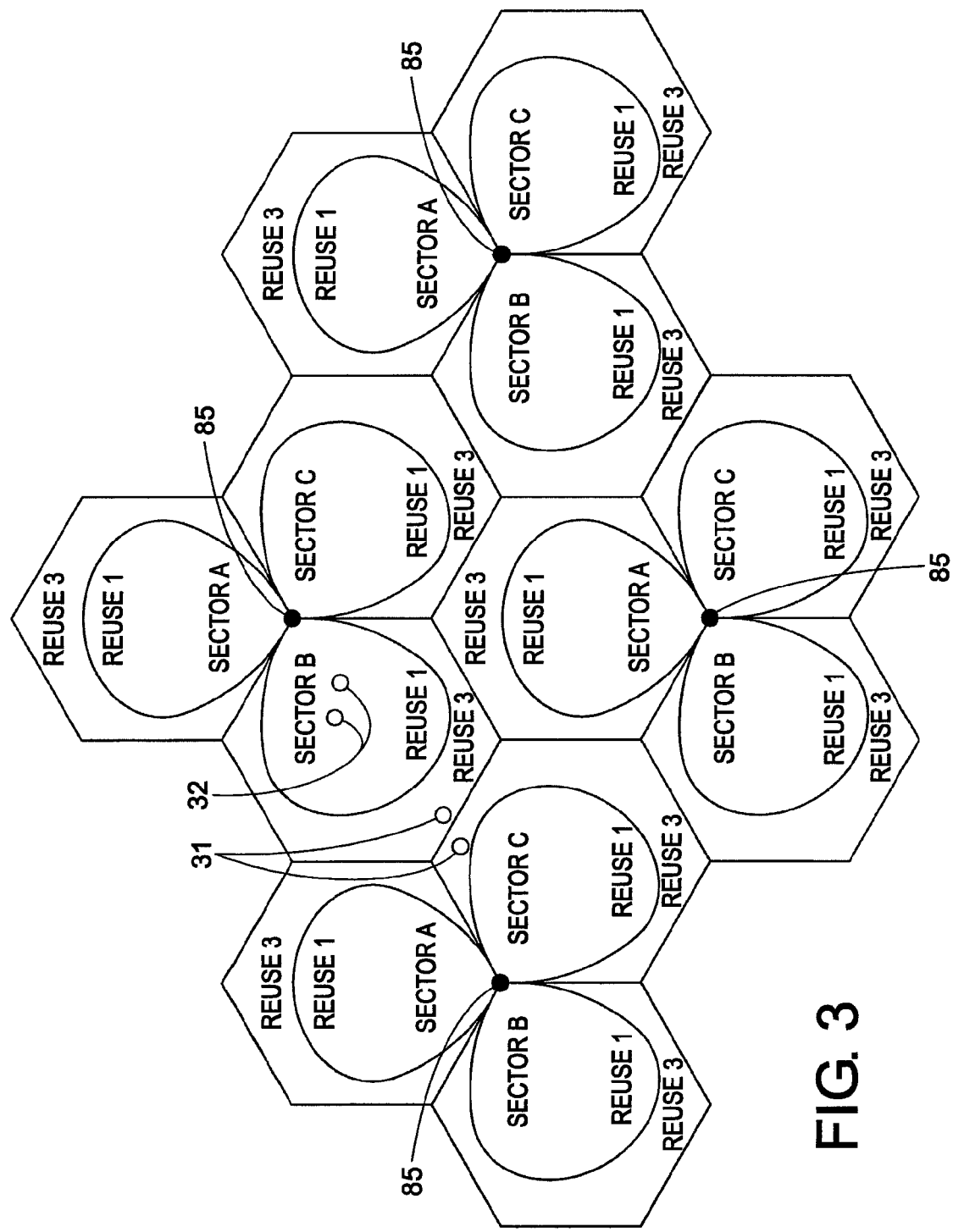
FIG. 3 shows a cell structure of a radio communication system using a method according to the present invention.

FIG. 3 shows a cell structure of a radio communication system using a method according to the present invention.

FIG. 3 shows a cellular radio communication network with base stations BS. The cell around each base station is divided in 3 sectors Sector A, Sector B, Sector C.

In a preferred embodiment of the present invention the decision on the power level to be used for transmitting signals to the different users is linked to the resource allocated to the users. Terminals with a selection criterion below (preamble receive power, CINR) or above (interference level, BER) the predefined threshold and to which signal at a power level Phigh is transmitted are scheduled in the frame following a frequency reuse scheme having a lower spectral efficiency (for example frequency reuse 3 scheme). This is especially advantageous as these terminals 31 are located near the cell/sector border and are subject to a high interference level.

Alternatively, terminals with a selection criterion above (preamble receive power, CINR) or below (interference level, BER) the predefined threshold and to which signal at a power level Plow is transmitted are scheduled in the frame following a frequency reuse scheme with a higher spectral efficiency (for example frequency reuse 1). This is also especially advantageous as these terminals 32 are located near to the base station and are less subject to interference on the one hand and should produce limited interference on the other hand.

The borders between the different frequency reuse zones are defined thanks to the selection criterion.

Figure 4:
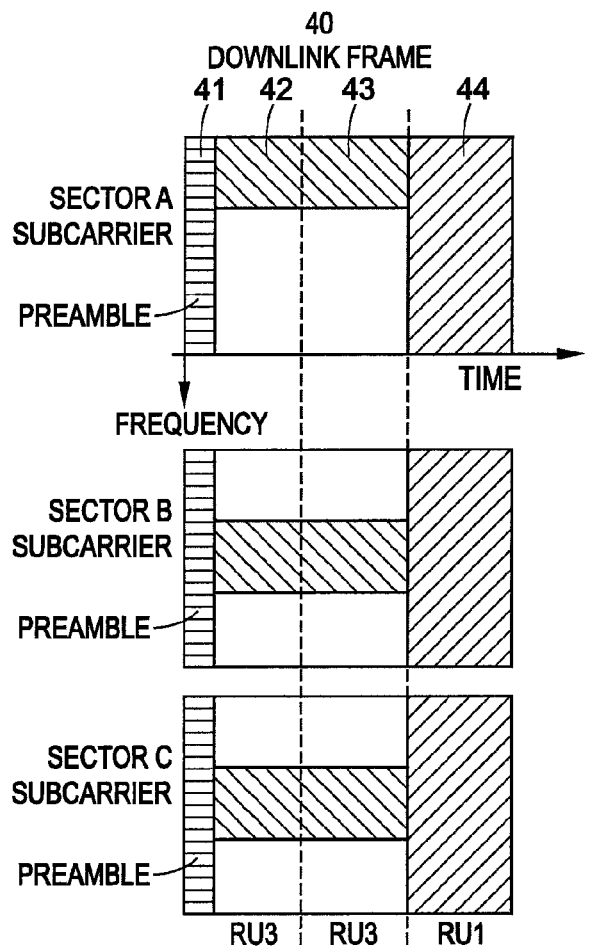
FIG. 4 shows a known resource allocation scheme in a frame showing a time and frequency extension.

FIG. 4 shows a known resource allocation scheme in a frame showing a time and frequency extension. Frame 40 shows a time extension along the horizontal axis and a frequency extension along the vertical axis. In its frequency extension, the frame is carried over a plurality of frequency subcarriers. In the time extension, the frame shows a preamble 41, a first data zone 42, a second data zone 43 and a third data zone 44.

The first data zone 42 is used for broadcast data. This data zone is not mandatory in the context of the present invention but may be specified for some types of networks.

The second zone 43 is used for sending data addressed to terminals scheduled with a frequency reuse scheme having a lower spectral efficiency (for example frequency reuse 3). In this zone, the subcarriers are splitted in 3 frequency domains f1, f2, f3 corresponding to the 3 sectors so that no frequency used in one sector is available for use in the two other sectors. For example f1 is used for terminals belonging to sector A, f2 is used for terminals belonging to sector B and f3 is used for terminals belonging to sector C.

The third data zone 44 is used for sending data addressed to terminals scheduled with a frequency reuse scheme with a higher spectral efficiency (for example frequency reuse 1).

Consequently, terminals scheduled with the different frequency reuse are separated in time.

Figure 5:
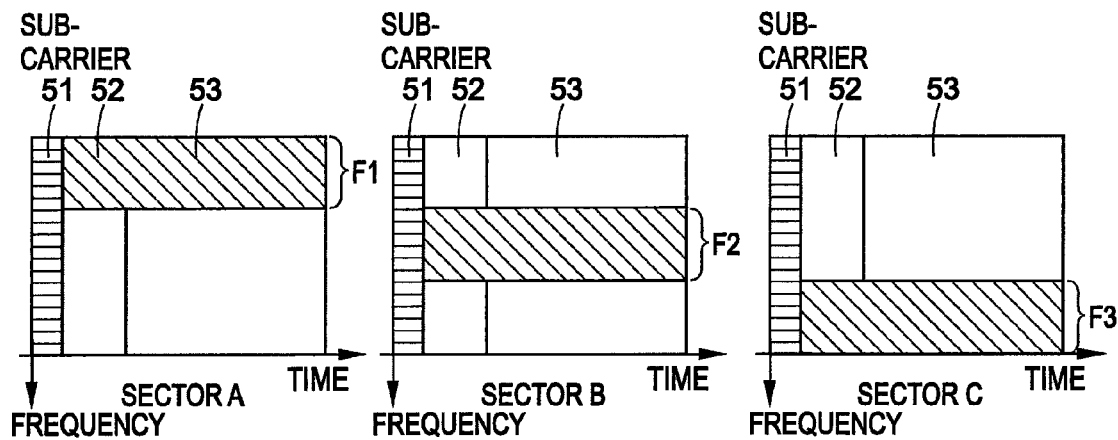
FIG. 5 shows a first resource allocation scheme in a frame showing a time and frequency extension according to the present invention.

FIG. 5 shows a first resource allocation scheme in a frame showing a time and frequency extension according to the present invention. The frame comprises a preamble zone 51 and an optional first data zone 52 as described in relation with FIG. 4. Further the frame contains a second data zone 53.

According to a preferred embodiment of the present invention and referring to FIG. 4, terminals scheduled using a frequency reuse scheme with a lower spectral efficiency (for example frequency reuse 3) can be not only scheduled in the second data zone 43 but also on the corresponding subcarriers in the third data zone 44. The same way, terminals scheduled with a frequency reuse scheme with a higher spectral efficiency (for example frequency reuse 1) can not only be scheduled in the third data zone 44 but also in the second data zone 43. Consequently in the second data zone 43 and the third data zone 44 described in relation with FIG. 4 are merged to a single second data zone 53 in connection with the present invention.

For terminals scheduled with a frequency reuse scheme with a lower spectral efficiency, the same subcarriers split is performed in the framework of the invention to avoid that users scheduled with this frequency reuse in one sector use the same subcarriers than users scheduled with this frequency reuse in the other two sectors. Frequency domain f1 is used for terminals belonging to sector A, f2, for terminals belonging to sector B and f3 for terminals belonging to sector C.

Terminals scheduled with a frequency reuse with a higher spectral efficiency can be allocated resources within the whole data zone 53. It follows that terminals with the different frequency reuse schemes are mixed together in data zone 53.

The invention has been described in connection with a cellular radio communication network with base stations showing 3 sectors. It will be understood by those skilled in the art that the method according to the present invention is also applicable to wireless access networks with different topologies. (e.g. only one sector per base stations or any usual number of sectors per base station).

In a preferred embodiment of the present invention, the determination of the power level to be used for sending data to the different terminals is done at regular time intervals for example for each new transmitted frame or each time the selection criteria (preamble receive power, preamble CINR, interference level on data portion, bit error rate) is reevaluated.

In a further preferred embodiment of the present invention, beamforming and/or MIMO is/are used to communicate with the terminals. The transmit power level to communicate with each user is determined according to the present invention.

Figure 6:
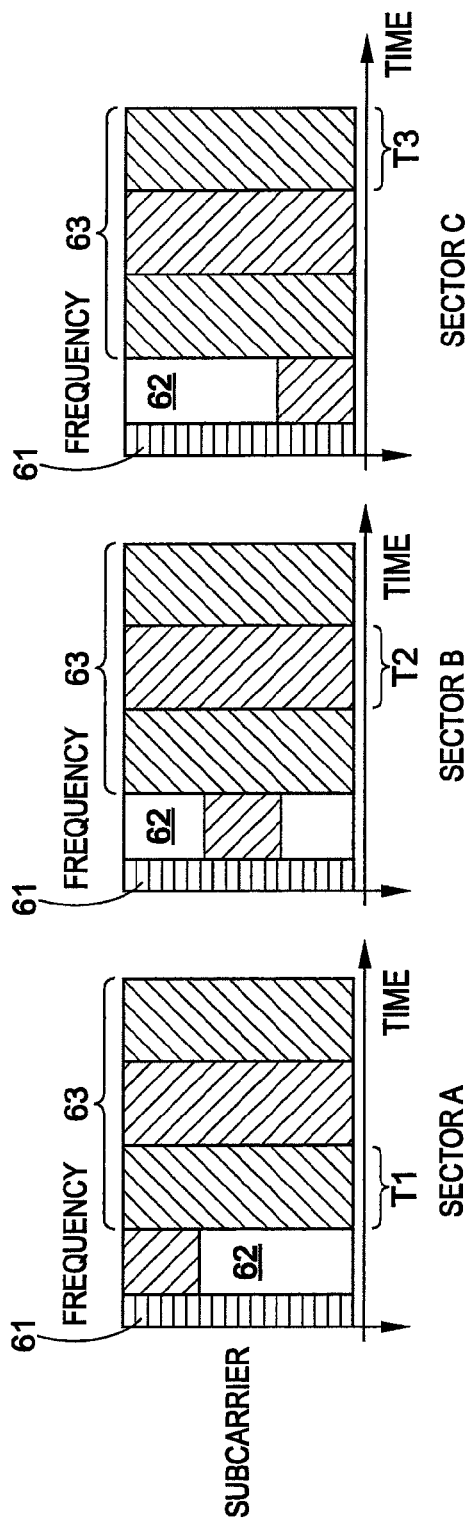
FIG. 6 shows a second resource allocation scheme in a frame showing a time and frequency extension according to the present invention.

FIG. 6 shows a second resource allocation scheme in a frame showing a time and frequency extension according to the present invention. The frame comprises a preamble zone 61 and an optional first data zone 62 as described in relation with FIG. 4. Further the frame contains a second data zone 63.

According to a preferred embodiment of the present invention and referring to FIG. 4, terminals scheduled using a frequency reuse scheme with a lower spectral efficiency (for example frequency reuse 3) can be not only scheduled in the second data zone 43 but also on the corresponding subcarriers in the third data zone 44. The same way, terminals scheduled with a frequency reuse scheme with a higher spectral efficiency (for example frequency reuse 1) can not only be scheduled in the third data zone 44 but also in the second data zone 43. Consequently in the second data zone 43 and the third data zone 44 described in relation with FIG. 4 are merged to a single second data zone 63 in connection with the present invention.

For terminals scheduled with a frequency reuse scheme with a lower spectral efficiency, a split in the time domain is performed to avoid that users scheduled with this frequency reuse in one sector use the same OFDM symbols in the time domain than users scheduled with this frequency reuse in the other two sectors. T1 is used for terminals belonging to sector A, T2, for terminals belonging to sector B and T3 for terminals belonging to sector C.

Terminals scheduled with a frequency reuse with a higher spectral efficiency can be allocated resources within the whole data zone 63. It follows that terminals with the different frequency reuse schemes are mixed together in data zone 63.

The invention has been described in connection with a cellular radio communication network with base stations showing 3 sectors. It will be understood by those skilled in the art that the method according to the present invention is also applicable to wireless access networks with different topologies. (e.g. Only one sector per base stations or any usual number of sectors per base station).

In a preferred embodiment of the present invention, the determination of the power level to be used for sending data to the different terminals is done at regular time intervals for example for each new transmitted frame or each time the selection criteria (preamble receive power, preamble CINR, interference level on data portion, bit error rate) is reevaluated.

In a further preferred embodiment of the present invention, beamforming and/or MIMO is/are used to communicate with the terminals. The transmit power level to communicate with each user is determined according to the present invention.

Figure 7:
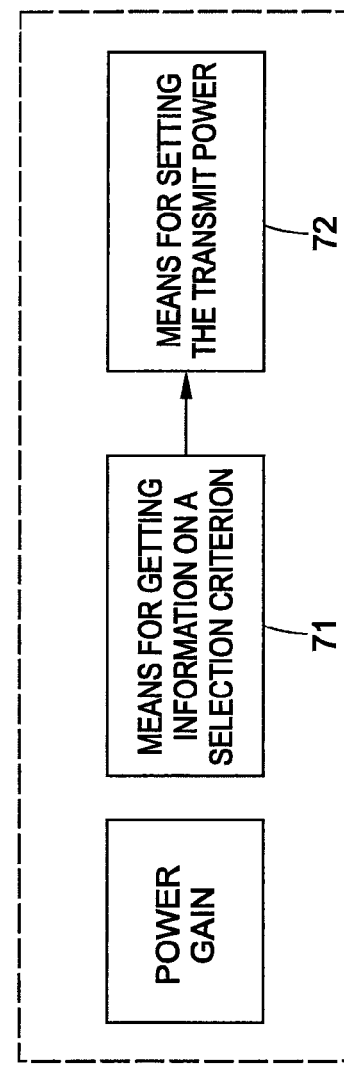
FIG. 7 shows a base station according to the present invention.

FIG. 7 shows a base station according to the present invention. Base station comprises means 71 for getting information on a selection criterion (preamble receive power, preamble CINR, interference level on data portion, bit error rate) and means 72 for setting the transmit power for the part of the data portion destined to a terminal in dependency of selection criterion and of a predefined threshold. The criteria for means 72 to set the transmit power are the following:
- the transmit power is adapted to generate a first receive power within a predefined range at the terminal when the selection criterion is above (preamble receive power, CINR) or below (interference level, BER) a predefined threshold;
- the transmit power is adapted to generate a second receive power within a predefined range at the terminal when the selection criterion is below (preamble receive power, CINR) or above (interference level, BER) a predefined threshold
- the second receive power is higher than the first receive power.

The predefined range is defined e.g. the following way: the lower part of the range corresponds to the reception of a non beamformed signal and the higher part of the range corresponds to the reception of a beamformed signal or otherwise boosted signal.

In a preferred embodiment, the difference between the first receive power and the second receive power is about 6 dB. For example, the preamble is received at the terminals at −70 dBm, the OFDM data portions are received at a first power level equal to −80 dBm and the OFDM data portions received at second power level equal to −74 dBm.

In a further embodiment of the present invention, an incremental decrease of the transmit power is performed to further reduce as much as possible the downlink interference. The limit of the transmit power decrease is determined by the experienced quality at the terminal.

It is especially advantageous to use a transmit power adapted to generate a receive power at the terminal below the lower limit of the predefined range (for example below −8 dBm of the IEEE 802.16e standard). For this purpose, it is nevertheless necessary to track regularly feedback messages from the terminal reporting indication on the quality of the received data it has received and processed. Such indication on the quality may be obtained from the downlink Received Signal Strength Indicator (RSSI) and/or Signal to Interference and Noise Ratio (SINR) measurement at the terminal reported to the base station via uplink channel through report response messages or fast feedback channel. Alternatively, the indication on the quality may be obtained indirectly from error rate measurements at the terminal, burst profile changes at the terminal or through the number of HARQ retransmissions.

In other words, the base station reduces the downlink transmit power step by step until the receive power of this burst measured at the terminal after the Amplifier Gain Control module is below the nominal receive power. This is done without additional MAC signaling. After each power reduction step, the base station observes the reaction of the terminal. If the downlink CINR measured by the terminal or any other criteria mentioned above would have as consequence that the downlink burst profile has to be reduced, then the downlink power reduction will degrade the performance. Consequently, the downlink power will be increased again to the required level.

In the opposite case, the terminal is able to decode a downlink signal below nominal power without performance degradation and the downlink power can be further reduced. This operation mode presents the advantage to be realized without amendments to the current standard IEEEE 802.16e.

In a further embodiment of the present invention, the terminal adjusts its amplifier gain control within the received frame between individual time symbols. This is especially required when the transmit power used by the base station has decreased below the lowest limit of the predefined range since using a higher amplification at the amplifier gain control would enable it to fit artificially into the predefined range again. For this purpose and to help the terminal to adapt its amplifier gain control to the different receive power levels of the different zones, the base station sends signaling messages containing an information on the power reduction to the terminal (e.g. in the DL-MAP) before the downlink burst with reduced power arrives at the terminal. The terminal then reacts to the power reduction by increasing the input signal amplification (as far as possible) for the corresponding burst. This embodiment presents the advantage that the terminal can use different input signal amplifications adapted to the different signal strengths received in the different zones.

Alternatively, the terminal is able to adjust the operating point of its amplifier gain control. The operating point of the amplifier gain control is shifted to higher nominal receive power, so that the reduced power in the following individual burst can still be decoded without performance degradation. This option requires that the amplifier gain control operating point can be adjusted within a certain margin with respect to the noise level. This adjustment is also controlled by messaging. This messaging could include also a capability message from the terminal to the base station indicating the available range of amplifier gain control adjustment.

The invention claimed is:

1. A method for reducing interference in the downlink direction of a cellular radio communication system, said method comprising:
    one or more base stations communicating with terminals using a frame structure showing a time and frequency extension, said frame comprising a preamble portion and at least one data portion, said one or more base stations being adapted to transmit frames to said terminals for which the receive power of said at least one data portion is varying in a predefined range relative to the preamble receive power of said preamble portion;

transmitting the part of said data portion destined to said terminal with a transmit power adapted to generate a first receive power at said terminal within said range if said terminal belongs to a first group of terminals;

transmitting the part of said data portion destined to said terminal with a transmit power adapted to generate a second receive power at said terminal within said range, said second receive power being higher than said first receive power, if said terminal belongs to a second group of terminals, wherein said terminals belonging to said first group are scheduled in said frame following a first frequency reuse scheme and said terminals belonging to said second group are scheduled in said frame following a second frequency reuse which is less efficient than said first frequency reuse scheme, and wherein said terminals scheduled according to said first frequency reuse scheme and terminals scheduled according to said second frequency reuse scheme share a common time domain in said frame and said second frequency reuse scheme uses 1/n of available frequencies by dividing the cell into n sectors.

2. The method according to claim 1, wherein said method further comprises:

getting information on the preamble receive power or on the preamble CINR (Carrier to Interference and Noise Ratio) of said frame at a terminal;

associating said terminal to said first group of terminals, if said preamble receive power or said preamble CINR is above a predefined threshold;

associating said terminal to said second group of terminals, if said preamble receive power or said preamble CINR is below said predefined threshold.

3. The method according claim 1, wherein said method further comprises:

getting information on the interference level in said at least one data portion of said frame at a terminal;

associating said terminal to said first group of terminals, if said interference level is below a predefined threshold; and associating said terminal to said second group of terminals, if said interference level is above said predefined threshold.

4. The method according claim 1, wherein said method further comprises:

getting information on a bit error ratio at a predefined modulation and coding rate in said at least one data portion of said frame at a terminal;

associating said terminal to said first group of terminals, if said bit error ratio is below a predefined threshold and associating said terminal to said second group of terminals, if said bit error rate is above said predefined threshold.

5. The method according to claim 1, wherein said determination of the first and second group of terminals is done on a per user and per burst basis, a burst corresponding to a data portion destined to a terminal inside a frame.

6. The method according to claim 1, wherein beamforming and/or MIMO technologies are used for transmitting data between said base station and said terminals.

7. The method according to claim 1, further comprising:

determining a start transmit power for the part of said data portion destined to said terminal, said start transmit power being adapted to generate a predefined receive power at said terminal within said range depending on the group of terminals said terminal belongs to;

checking a signal quality indicator transmitted from said terminal upon reception of data from said base station;

decreasing incrementally said transmit power for the part of said data portion destined to said terminal by a predefined value, if said signal quality is above a predefined threshold.

8. The method according to claim 1, further comprising:

sending a message to the terminal containing the indication of the decrease of said transmit power by said base station for data destined to said terminal when said decreased transmit power is adapted to generate a receive power at said terminal below said range;

adjusting an amplifier gain control at said terminal depending on said decrease.

9. A base station adapted to be used in a cellular radio communication network, said base station comprising:

a transmitter operative to communicate with terminals using a frame structure showing a time and frequency extension, said frame comprising a preamble portion and at least one data portion, said transmitter being adapted to transmit frames to said terminals for which the receive power of said at least one data portion is varying in a predefined range relative to the preamble receive power of said preamble portion;

the transmitter operative to transmit the part of said data portion destined to said terminal with a transmit power adapted to generate a first receive power within said range at said terminal if said terminal belongs to a first group of terminals;

the transmitter operative to transmit the part of said data portion destined to said terminal with a transmit power adapted to generate a second receive power within said range at said terminal if said terminal belongs to a second group of terminals, wherein said terminals belonging to said first group are scheduled in said frame following a first frequency reuse scheme and said terminals belonging to said second group are scheduled in said frame following a second frequency reuse which is less efficient than said first frequency reuse scheme, and wherein said terminals scheduled according to said first frequency reuse scheme and terminals scheduled according to said second frequency reuse scheme share a common time domain in said frame and said second frequency reuse scheme uses 1/n of available frequencies by dividing the cell into n sectors.

10. The base station according to claim 9, further comprising:

a receiver operative to receive information on the preamble receive power or on the preamble CINR (Carrier to Interference and Noise Ratio) of said frame at a terminal;

a controller operative to associate a terminal to said first group of terminals, if said preamble receive power or said preamble CINR is above a predefined threshold; and the controller operative to associate a terminal to said second group of terminals, if said preamble receive power or said preamble CINR is below said predefined threshold.

11. The base station according to claim 9, further comprising:

a receiver operative to receive information on the interference level in said at least one data portion of said frame at a terminal;

a controller operative to associate a terminal to said first group of terminals, if said interference level is below a predefined threshold and the controller operative to associate a terminal to said second group of terminals, if said interference level is above said predefined threshold.

\* \* \* \* \*